United States Patent [19]
Fahimian et al.

[11] 4,055,704
[45] Oct. 25, 1977

[54] TYPING CORRECTION PAPER

[76] Inventors: John Fahimian; Clive H. Hare, both of 72 Second St., Cambridge, Mass. 02141

[21] Appl. No.: 601,323

[22] Filed: Aug. 1, 1975

[51] Int. Cl.$^2$ .......................... B32B 9/06; B32B 5/30; B32B 9/04
[52] U.S. Cl. ........................................ 428/411; 106/27; 106/296; 106/300; 106/306; 106/308 F; 106/308 N; 156/234; 156/326; 197/172; 197/181; 260/567.6 M; 427/146; 427/147; 427/153; 428/537; 428/539; 428/914
[58] Field of Search .............. 428/914, 537, 539, 411, 428/913; 427/146, 147, 153; 252/316; 260/567.6 M; 197/172, 181; 156/234, 326; 106/27, 266, 308 F, 308 N

[56] References Cited
U.S. PATENT DOCUMENTS

| | | | |
|---|---|---|---|
| 3,114,447 | 12/1963 | Wolowitz | 197/172 |
| 3,459,127 | 8/1969 | Barouh | 197/181 X |
| 3,515,572 | 6/1970 | Dabisch | 428/914 X |
| 3,776,864 | 12/1973 | Woerner | 428/914 X |
| 3,813,441 | 5/1974 | Müller-Schiedmayer et al. | 260/567.6 M |
| 3,922,240 | 11/1975 | Berg et al. | 260/567.6 M X |

*Primary Examiner*—Charles E. Van Horn
*Assistant Examiner*—Thomas Bokan
*Attorney, Agent, or Firm*—Richard P. Crowley

[57] ABSTRACT

A correction sheet material for masking characters on a substrate is composed of a carrier sheet and a thin dry coating layer on the carrier sheet, the coating layer adapted, on the application of sufficient pressure, to be transferred from the carrier sheet onto the characters on the substrate, the coating layer comprising a pigment in an amount to provide sufficient opacity to cover the characters to be masked, and a high molecular weight organic ammonium salt as a binder for the pigment, and as an adhesive agent for the subsequently transferred coating, the salt insoluble in water and also in oils used in typewriter ink and carbon paper, the salt present in the coating layer in both continuous film and precipitated salt form and on the application of pressure, a strong opaque film of pigment and precipitated salt particles is transferred to mask the character on the substrate.

11 Claims, No Drawings

TYPING CORRECTION PAPER

BACKGROUND OF THE INVENTION

Transfer sheets, such as typing correction paper, carbon paper, decalcomania sheets and the like, typically comprise a thin opaque coating layer on a carrier sheet, such as fabric, paper or a deformable plastic sheet like polyethylene. The coating layer is subject to transfer to another surface by the application of a certain pressure level, such as the pressure exerted by a typewriter key, but is immune to transfer by light pressure, such as by ordinary handling or use. In effect, such transfer sheets permit the physical movement of a portion of the dry coating layer to another surface on the application of pressure which is sufficient to rupture the adhesive bond of the coating layer to the carrier sheet, and which increases the adhesive bond in the dry coating layer. Depending on the particular use, the coating layer may be the same or a different color or shade than the surface to which the layer is to be transferred. In correction paper, the coating layer more commonly is designed to match the paper to be corrected so that erroneously typed characters may be effectively masked by the use of the correction paper.

Pressure-sensitive transfer sheets, particularly correction paper as presently commercially marketed, typically comprise a carrier sheet with a coating composition composed of a pigment like titanium dioxide to provide opacity, a transferable binder composed of metallic soaps, waxes, resin and/or oils, and an adhesive agent to affix or adhere the binder and pigment lightly to the carrier sheet prior to cohesion and transfer of the coating layer on the application of pressure. Typical transfer sheet materials and the coating compositions employed are described in U.S. Pat. Nos. 2,931,752; 3,025,180; 3,515,572; 3,552,990; and 3,776,756. Our invention relates to the field of transfer sheets and improved transfer sheets, particularly typing correction papers and to methods of preparing such materials.

SUMMARY OF THE INVENTION

Our invention relates to transfer sheet materials, particularly correction sheet materials and to methods of preparing and using such materials. In particular, our invention concerns a correction sheet with an improved and novel coating layer on the carrier sheet.

Our transfer sheet materials comprise a carrier sheet or substrate and a thin coating layer thereon which is pressure-sensitive, and which layer comprises an opaque particulate material, such as a pigment, and an ammonium salt. We have found that the use of metallic organic materials or other prior art binders in transfer sheets and the disadvantages associated therewith may be avoided by the use in particular organic ammonium salt compounds. Further, we have discovered that a certain class of organic ammonium salts of our invention may be employed as combination binder and adhesive agents in transfer sheet layers. Our organic ammonium salts also function as wetting agents for the pigment used to opacify the coating layer and permit excellent dispersion of the pigments in the preparation of the coating mixture.

In our invention, a single ammonium salt can function as both the binder and adhesive, since it can coexist in two different physical states within a transferable coating layer. It can exist as a continuous film. Also, it can exist in the form of microscopic-sized discrete, precipitated particles. This property occurs because of the unique combination of a high molecular weight and highly ionic character of the organic ammonium salts used in our invention. The combined effect of these two properties strongly influences solubility in such solvents as petroleum naphthas and alcohols and the degree to which they precipitate from a solution in these solvents. Thus when a suitable organic salt is made to dissolve completely in a heated solvent to which a pigment, such as titanium dioxide, is added, a large fraction of the salt will precipitate out as discrete particles when the mixture is ultimately cooled. A small fraction of the salt will remain dissolved even in the cold mixture. If this mixture is then coated in a thin layer onto a substrate, such as paper, the precipitated salt and the pigment will deposit as discrete particles. The remaining salt, being completely dissolved in the solvent system, forms a lightly cohesive film as the solvent evaporates, which loosely binds both pigment and precipitated salt together and to the substrate; for example, in a weight ratio of film to precipitate salt of about 0.01 to 0.40. In this form as a dry coating, the product is ready for use as a transfer sheet material.

The organic ammonium salts useful in our invention comprise those salts which have a sufficiently high molecular weight to have a melting point above normal storage temperatures; for example, above about 130° F, and which at least are partially soluble in the selected solvent system employed to form the coating layer. Such salts comprise the cationic surface-active acyclic organic ammonium salts having one, two, three or four hydrocarbon-saturated or unsaturated substituent groups, particularly the mono and di alkyl and fatty acid long-chain hydrocarbon salts. The remaining substituent groups may be hydrogen or lower alkyl groups; e.g., $C_1$-$C_4$, such as methyl. In particular, the ammonium salts useful in our coatings should have one or more organic groups of at least 18 carbon atoms; e.g., from about 18 to 22 carbon atoms or a mixture thereof. Also useful is a mixture containing ammonium salts with one or more organic groups of 16 and fewer carbon atoms and ammonium salts, with one or more organic groups of 18 to 22 carbon atoms. In the preferred embodiment, the ammonium salts comprise mono or di $C_{18}$-$C_{22}$ saturated or unsaturated long-chain hydrocarbon groups and mono or di hydrogen atoms or methyl groups. When only ammonium salts containing organic groups of 16 and fewer carbon atoms are used, we have found that the correction sheets are unsatisfactory, since bleedthrough of the typewriter ink often occurs due to the higher solubility of salts containing such groups.

The high molecular weight organic acyclic ammonium salts useful in our coatings are represented by the formula:

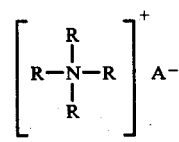

wherein R is a cationic organic radical or hydrogen atoms with at least one R being a cationic organic radical, and A is an anionic radical as herein set forth. Where all the Rs are organic radicals, the salt is referred to as a quaternary ammonium salt, and otherwise the ammonium salts are sometimes referred to as amine salts. The amine salts are formed by the reaction of a primary, secondary or tertiary amine with an acid. For the purpose of this application, the term "ammonium salt" shall be used to define such quaternary and amine salts where the nitrogen atom contains four radicals bonded thereto.

The organic cationic radicals include, but are not limited to; the arichidyl-behenate, stearate, oleate, linoleate, tallow and other fatty acid $C_{18}$–$C_{22}$ groups and mixtures thereof.

The other cationic radicals are hydrogen or lower alkyl groups, typically methyl. The anionic radicals are often a halogen like a chloride, iodide or bromide, but other anionic groups may also be used, such as sulfates, phosphates, carbonates, acetates, hydroxyls, nitrates, etc. Specific organic ammonium salts suitable for use include, but are not limited to: dimethyl di-hydrogenated tallow ammonium chloride; dimethyl di-arichidyl-behenic ammonium chloride; arichidyl-behenic ammonium chloride; arichidyl-behenic ammonium bromide and the like. The ammonium salts in the coating layer may be used preferably alone or if desired with other compounds and additives. Typically, the salts are used in an amount to function as both a cohesive pigment binder and an adhesive, such as in an amount in the dry coating layer of from 5 to 45% by weight of the layer or in a ratio of salts to pigment of about 0.06 to 0.07.

The material employed to impart opacity to the coating layer may comprise a wide variety of opaque particulate pigment or pigment-like material, such as metal oxides and salts like carbonates, sulfates, etc., of titanium, antimony, barium, calcium, zinc, cadmium, iron and the like, such as titanium dioxide, zinc oxide, calcium carbonate, as well as clay, talc and other materials used to impart opacity to a coating and as set forth in the cited prior art patents, alone or in combination. Where a correction sheet material is involved, a light-colored pigment material to mask the erroneously typed or printed characters is selected. The pigment color may be typically the same as the typed paper, so that corrections are not detectable, but may differ in color if desired by pigments or dyes. Where carbon paper is to be prepared, the opacifying material would include carbon and other additives to impart a recognizable image on the paper.

The amount of pigment material may vary as desired; however, pigment volume concentrations as defined by:

$$\frac{\text{volume of pigment}}{\text{volume of pigment and volume of ammonium salt}}$$

in the coating layer of from 35 to 75%; e.g., 45 to 65%, may be used.

The compositions employed to prepare the dry coating layer of our transfer paper include solvents in which the pigment material is dispersed with the ammonium salt compound. The salts and pigments may be used alone or in combination as desired. Suitable solvents are organic solvents in which the salts are partially soluble at the temperature of coating the thin layer on the carrier sheet. The solvents are volatile in nature to permit their removal by evaporation or with heating, and include alcohols ketones and hydrocarbons, as well as diluents where desired. Typical solvents include, but are not limited to, isopropanol, methanol, ethanol, toluene, benzene, petroleum naphtha, methylethyl ketone, acetone and other solvents typically used in preparing such coatings, such as those solvents set forth in the cited prior art patents.

The carrier sheets on which the thin dry coating layer containing the salts and pigment combination of our invention are prepared include any substrate sheet material, but typically for correction sheet materials comprise a thin sheet material of paper, fabric or of a polymer like polyethylene to which the dry coating layer is loosely adhered, and which, when struck on the opposite side by a typewriter key in the case of correction paper, is sufficiently thin; e.g., 0.1 to 10 mils, to impart the pressure to the coating layer and effect the desired transfer. The dry coating layer may vary in thickness depending upon the material to be marked or transferred; however, it typically is from 0.1 to 10 mils; for example, 0.3 to 3.0 mils in thickness.

For the purpose of illustration only, our invention will be described more particularly with specific examples directed to the preparation and use of correction sheet materials; i.e., a correction paper used to mask or cover over typing errors; however, it is recognized that various changes and modifications can be made by those skilled in the art without departing from the spirit and scope of our invention.

DESCRIPTION OF THE EMBODIMENTS

Various coating compositions were prepared as hereinafter set forth in the examples and coated onto a carrier sheet, such as paper, and dried to form an improved correction paper. The correction paper prepared permitted the coating layer to be transferred to the paper carrier to and over an erroneously typed character on a paper sheet to mask the character, and presented a masked film-like surface adapted to receive a second correctly typed or printed character.

Example No. 1

| | |
|---|---|
| Dimethyl Di-hydrogenated Tallow Ammonium Chloride | 163 mls |
| Titanium Dioxide | 100 mls |
| Petroleum Naphtha | 470 mls |

The above composition has a pigment volume concentration of 38%. For a satisfactory product, it is coated at 3 wet mils at 22° C and dried at 35° C.

Example No. 2

| | |
|---|---|
| Dimethyl Di-Arichidyl-Behenic Ammonium Chloride | 120 mls |
| Titanium Dioxide | 100 mls |
| Isopropyl Alcohol | 640 mls |

The above composition has a pigment volume concentration of 45½%. It is coated at 3 wet mils at 22° C and dried at 42° C.

Example No. 3

| | |
|---|---|
| Arichidyl-Behenic ($C_{20}H_{41}$) Ammonium Chloride | 125 mls |
| Titanium Dioxide | 100 mls |
| Isopropyl Alcohol | 513 mls |

The above composition has a pigment volume concentration of 44½%. It is coated at 3 wet mils at 25° C and dried at 30° C.

Example No. 4

| | |
|---|---|
| Arichidyl-Behenic Ammonium Bromide | 220 mls |
| Titanium Dioxide | 100 mls |
| Calcium Carbonate | 220 mls |
| Petroleum Naphtha | 3100 mls |

The above composition has a pigment volume concentration of 59%. It is coated at 3 wet mils at 25° C and dried at 37° C.

In the above-prepared correction paper, the transfer is effected simply by placing the coated paper against the sheet of paper upon which the error has been made so that the coated face of the correction paper actually touches the erroneously typed character. When the reverse side of the correction paper; i.e., the uncoated side, is struck by a typewriter key bearing the same character as that of the error, the impact of the key upon this reverse side of the correction paper effects a delamination of the coating on the front side. The coating delaminates from its substrate carrier along the points of impact; i.e., along the outline of the type character, and transfers along these same points to the identical points on the error, thereby masking over the incorrectly typed character.

In this operation, the discrete particles of the precipitated ammonium salt and the pigment particles are compressed together with great force against the typed error. Under such force, the particles of precipitated salt are forced close together to initiate the formation of a primary and secondary valency-bonded cohesive network between salt, pigment and erroneously typed character. In this way, the coating is transferred onto the error and the error is thus masked over.

In the dried film cast from a solvent mixture onto a supporting substrate, individual molecules of salt from the solution and individual clusters of precipitated salt molecules remain to a large extent, separated from each other by atomic distances greater than those necessary to initiate secondary or primary bonding; i.e., greater than about 5 angstroms. When the film is compressed under the pressure of a typewriter key, the individual molecules of salt and the clusters of precipitated salt molecules are forced close enough together for intermolecular bonding between salt molecules to occur. The transferred film thus is strongly cohesive and maintains its integrity under the pressure of the correctly retyped character.

The high molecular weight of the ammonium salts and their highly polar groups both are properties which assist in making a binder which in correction paper makes the corrections last for a long time. Specifically, the high molecular weight of the salts renders them insoluble in water and oils, such as are used in the formulation of the inks in typewriter ribbons and carbon paper. The nonsoluble property helps prevent the bleeding of the typewriter inks back into the transferred coating covering the error. Also, the highly polar nature of the salts causes the primary and secondary valency-bonded network between salt, pigment and typed character to be very strongly bonded. Thus, the transferred coating is a strong film of coalesced salt particles, which film is strong enough to prevent diffusion of the typewriter inks back into the coating which covers the error.

The $C_{18}$–$C_{22}$ ammonium salts when used as the binder-adhesive prevent bleeding back of typewriter inks into the covering correction layer and make products using these salts superior to many products currently on the market. This is especially true when one compares the performance of correction paper now on the market which uses metal soaps, such as aluminum stearate, as a binder, with the products described herein. Many of these metal-soap-utilizing correction paper products show a shadow of the covered error just a few hours after making a correction, due to this bleeding back effect. Furthermore, because the nonmetallic organic ammonium salts have great affinity for pigment and the carrier; e.g., paper because of their wetting properties, it is more desirable to use such salts as the binder-adhesive than to use the metal soaps which typically are not good wetting agents.

The solubility in any solvent mixture of the salts is a function of the groups in the salt molecule. The solubility is highly dependent on the temperature of application. In any given organic solvent, the salts will be completely soluble at a sufficiently high temperature. As the temperature is lowered, the solubility is reduced and some salt is precipitated from solution. At a sufficiently low temperature, the solubility is reduced to almost zero and all the salt precipitates. When such a salt is used in the type of correction paper composition described, the temperature of application and of drying should be controlled during the coating process, so as to maintain a constant ratio of precipitated salt (binding agent) to solubilized salt (adhesive agent). The composition of the solvent mixture also should be controlled, as variations in the solvent composition can result in variations in the ratio of the precipitated to solubilized salt. Typically the temperature of application and drying should be up to 100° C and not below 20° C; e.g., 25° C to 55° C, depending on the solvents.

The choice of the substrate carrier sheet; e.g., paper or plastic film, is important. If a very porous substrate is used, some of the dissolved salt of the coating layer will migrate into this substrate, thereby depriving the composition of the deposited layer of some of the adhesive film needed to bind loosely the layer to the substrate. The result will be a dried layer which is quite chalky. It is, therefore, most desirable to utilize a substrate carrier of controlled porosity so as to prevent wasteful use of the ammonium salt.

In the use of the correction paper, the error, once corrected by a covering layer, must be strong and cohesive enough to receive subsequently typed characters. In the correction of most errors, the correct character is often typed over the incorrect character once the latter has been covered over with a correcting layer. The degree to which it is possible to type over a covering layer without removing or otherwise disturbing the covering layer is directly related to the strength of this layer. The strength of the layer is partly dependent on how strongly the binder binds the pigment to the paper as described above. However, it is also dependent on the amount of binder (precipitated salt) in the coated layer. Coatings having a high percentage of binder produce a strongly bound correction which will receive the new, correct character with one strike from the typewriter. Compositions containing too little binder, while masking the incorrect character satisfactorily, are not sufficiently strong to receive the new character. When insufficient binder has been used, an examination of the typewriter ribbon after retyping the correct character will show that the layer which had previously transferred from the correction paper to the incorrect character now transfers back onto the typewriter ribbon. Since part of the layer has adhered to the ribbon, the resultant correction is incomplete, and several further type-overs of the same character are required before the correction is satisfactory. Furthermore, this phenomenon reduces the thickness of the correction layer and degrades the opacity of the correction.

If the percentage of ammonium salt in the coating composition is too high; for example, over 65% by volume, the percentage of the pigment may be too low; for example, less than 35%, to provide enough opacity to ensure good corrections. Although thicker films of such compositions will result in greater opacity, such films are thick and noticeable when transferred. Furthermore, such thick films tend to delaminate in flakes from the supporting substrate, peeling off in sheets prior to use and during normal handling. There is, therefore, for each composition, an upper limit to the amount of precipitated salt necessary to make a wholly satisfactory correction product. The optimum percentage of solubilized salt, which can easily be determined by testing, produces a coated layer which, when dried, contains enough adhesive to be strong and non-chalky, but which transfers from the supporting carrier substrate to an incorrectly typed character with no difficulty.

All of the above parameters may be controlled simply in any given formulation utilizing our ammonium salts by regulating the pigment volume concentration, solvent system, and the temperature at which the coating composition is applied to and dried on the supporting substrate. Although suitable compositions may be formulated for almost all types of substrates, the widely varying absorbencies of different substrates usually require that the formulation undergo some modification for each one. In the examples given, the cohesion of the dried film was slight so as not to cause flaking during normal handling, but not so poor as to render the coated layer chalky. When transferred to the erroneously typed character, the resultant masking layer had enough strength to withstand the impact of retyping, and yet have enough pigment to opaque out the error.

What we claim is:

1. A correction sheet material for masking characters on a substrate, which material consisting essentially of:
   a. a carrier sheet; and
   b. a thin dry coating layer on the carrier sheet, the coating layer adapted, on the application of sufficient pressure, to be transferred from the carrier sheet onto the characters on the substrate, the coating layer comprising a pigment in an amount to provide sufficient opacity to cover the characters to be masked, and a high molecular weight organic ammonium salt as a binding and adhesive agent for the pigment, the salt insoluble in water and in oils used in typewriter ink and carbon paper, the salt present in the coating layer in both continuous film and precipitated salt form, whereby, on the application of pressure, a strong opaque film of pigment and precipitated salt particles is transferred to mask the character on the substrate.

2. The correction material of claim 1 wherein the pigment volume concentration of the dry coating ranges from about 35 to 75%.

3. The correction material of claim 1 wherein the ammonium salt contains one or more $C_{18}$ to $C_{22}$ cationic organic carbon chains.

4. The correction material of claim 3 wherein the salt comprises a mono or di $C_{18}$ to $C_{22}$ quaternary ammonium salt.

5. The correction material of claim 4 wherein the salt comprises a di lower alkyl or hydrogen atoms and a di $C_{18}$–$C_{22}$ fatty acid organic radical.

6. The correction material of claim 1 wherein the ammonium salt is a quaternary ammonium halide having one or two cationic $C_{18}$–$C_{22}$ organic radicals, and the remaining cationic radicals are methyl.

7. The correction material of claim 1 wherein the ammonium salt is selected from the group consisting of dimethyl di-arichidyl-behenic ammonium halide, a mono arichidyl-behenic ammonium halide, a di-arichidyl-behenic ammonium halide and a dimethyl di tallow quaternary ammonium halide.

8. The correction material of claim 1 wherein the pigment is selected from the group consisting of titanium dioxide, zinc oxide, calcium carbonate and mixtures thereof.

9. The correction material of claim 1 wherein the coating layer ranges in thickness from about 0.3 to 3 mils.

10. The correction material of claim 1 wherein the carrier sheet is selected from the group consisting of a paper sheet and plastic film material.

11. A correction sheet material for masking typed characters on a typed paper substrate, which material consisting essentially of:
   a. a thin film carrier sheet; and
   b. a thin dry coating layer bonded to the carrier sheet so that the layer will not transfer on normal handling, but adapted, on the application of pressure from a typewriter key, to be transferred onto a paper to mask over characters on the paper, the dry coating layer consisting essentially of
      i. particulate pigments in an amount sufficient to provide opacity to cover the character to be masked; and
      ii. a mono, di or tri $C_{18}$ to $C_{22}$ organic ammonium halide salt with the remaining cationic radicals of methyl radicals or hydrogen atoms, the salt present in the coating layer as continuous film and in precipitated salt form, the pigment volume concentration of the pigments in the coating layer ranging from about 35 to 75%.

* * * * *